(12) United States Patent
Selverston et al.

(10) Patent No.: US 11,581,563 B2
(45) Date of Patent: Feb. 14, 2023

(54) ZINC-IRON FLOW BATTERY

(71) Applicant: CASE WESTERN RESERVE UNIVERSITY, Cleveland, OH (US)

(72) Inventors: Steven Selverston, Cleveland Heights, OH (US); Jesse Wainright, Willoughby Hills, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 395 days.

(21) Appl. No.: 16/347,372

(22) PCT Filed: Nov. 3, 2017

(86) PCT No.: PCT/US2017/059888
§ 371 (c)(1),
(2) Date: May 3, 2019

(87) PCT Pub. No.: WO2018/085634
PCT Pub. Date: May 11, 2018

(65) Prior Publication Data
US 2019/0363387 A1      Nov. 28, 2019

Related U.S. Application Data

(60) Provisional application No. 62/417,761, filed on Nov. 4, 2016.

(51) Int. Cl.
*H01M 8/18* (2006.01)
*H01M 8/0239* (2016.01)
*H01M 8/0245* (2016.01)
*H01M 8/08* (2016.01)

(52) U.S. Cl.
CPC .......... *H01M 8/188* (2013.01); *H01M 8/0239* (2013.01); *H01M 8/0245* (2013.01); *H01M 8/08* (2013.01)

(58) Field of Classification Search
CPC .... H01M 8/0239; H01M 8/0245; H01M 8/08; H01M 8/188; Y02E 60/528
See application file for complete search history.

(56) References Cited

U.S. PATENT DOCUMENTS

| | | | | |
|---|---|---|---|---|
| 4,069,371 A | * | 1/1978 | Zito | H01M 12/08 429/409 |
| 2011/0244277 A1 | * | 10/2011 | Gordon, II | H01M 50/70 429/51 |
| 2014/0030631 A1 | * | 1/2014 | Esswein | H01M 8/20 429/499 |

(Continued)

OTHER PUBLICATIONS

Gong et al., "A zinc-iron redox-flow battery under $100 kW h of system capital cost." Energy & Environmental Science, vol. 8, pp. 2941-2945. (2015).

(Continued)

*Primary Examiner* — Adam A Arciero
(74) *Attorney, Agent, or Firm* — McDonald Hopkins LLC

(57) ABSTRACT

A zinc-iron chloride flow battery relies on mixed, equimolar electrolytes to maintain a consistent open-circuit voltage of about 1.5 V and stable performance during continuous charge-discharge. Considering the good performance relative to the low-cost materials, zinc-iron chloride flow batteries represent a promising new approach in grid-scale and other energy storage applications.

11 Claims, 10 Drawing Sheets

(56) References Cited

U.S. PATENT DOCUMENTS

2014/0057140 A1* 2/2014 Bendert ............ H01M 8/04447
                                                        429/51
2014/0227574 A1    8/2014 Savinell et al.
2014/0363747 A1   12/2014 Evans et al.
2018/0090777 A1*  3/2018 Pozzo ................ B01D 67/0076
2018/0294502 A1* 10/2018 Selverston ............. H01M 8/20

OTHER PUBLICATIONS

International Search Report and Written Opinion dated Jan. 29, 2018; International Patent Application No. PCT/US2017/059888 filing date Nov. 3, 2017.

* cited by examiner

ZINC-IRON FLOW BATTERY

RELATED APPLICATIONS AND TECHNICAL FIELD

This application 35 U.S.C. 371 national stage filing of PCT Application No. PCT/US2017/059888 filed on Nov. 3, 2017, which claims priority to U.S. Provisional Patent Application Ser. No. 62/417,761, filed on Nov. 4, 2016 is each of which are incorporated by reference in their entirety herein. Also, this invention was made with government support under Contract 1111358,0 awarded by the United States Department of Energy, Office of Electricity. The government has certain rights in the invention.

BACKGROUND

A flow battery is a rechargeable battery that uses electrolytes moving ("flowing") through an electrochemical cell to convert chemical energy from the electrolyte into electricity (and vice versa when charging). The active materials used in flow batteries are generally composed of ionized metal salts or redox active organic compounds dissolved in a fluid, such as water or an organic solvent(s). Additional salts or acids, such as NaCl or HCl, may also be provided to the fluid so as to create a highly conductive electrolyte.

The electrolytes for flow batteries are typically stored in separate tanks and then pumped through individual cells of the flow battery in a controlled manner, usually according to the charge/discharge current applied. Multiple cells may be employed (i.e., "stacked"), in series or in parallel, in order to create the desired electrical characteristics for the battery.

Each cell consists of a positive (cathode) and negative (anode) electrode and a separating membrane. The electrodes catalyze the desired reactions. The membrane that allows the conduction of ions necessary to complete the electrical circuit, while preventing the electrodes from coming into contact. The separator should also prevent any mixing of the circulating positive and negative electrolytes and minimize the movement of species produced in an electrolyte during charging from crossing over or intermingling with the other components (e.g., the other electrolyte). Additional mechanical and control structures may be employed to generate and sustain the desired flow of electrolyte/reactants through the cell(s).

A true flow battery has all the active chemical species flowing through the battery and stored in the external tanks. Reduction-oxidation (redox) flow batteries, such as vanadium or iron redox batteries, store electrical energy in a chemical form and subsequently dispense the stored energy in an electrical form via a spontaneous reverse redox reaction. The discharged electrolyte can be flowed through a reactor cell with an external voltage source applied such that electrical energy is converted back to chemical energy.

In practice, flow batteries are similar to fuel cells, in that they rely upon electron transfer (rather than intercalation or diffusion). Flow batteries also possess similarities to rechargeable batteries, in that the active material may be easily replenished outside of the cell (e.g., in the storage tanks through the application of an appropriate electrical charge).

Taken together, flow batteries have advantages in comparison to the conventional batteries. In particular, conventional batteries have limited discharge capacity based upon the active material contained within the cell (a parallel can also be drawn to rechargeable batteries in this regard, in that recharageable batteries have limitations on cycling owing to the inherent limitations of repeated intercalation).

To date, flow batteries have found utility in larger, stationary applications and/or in combination with other power generation schemes. Nevertheless, flow batteries may soon find new use/application in "traditional" energy industry concerns, including hydrocarbon producers and alternative energy concerns because of their potential portability and reusability. In particular, portable power device manufacturers and hybrid/electric vehicle maker may soon consider flow battery systems to overcome the shortcomings noted above.

Examples of flow batteries can be found in United States Patent Publication No. 2014/0227574; International Patent Application No. PCT/US16/56230 filed on Oct. 10, 2016; and International Patent Application No. US15/50676 filed on Sep. 17, 2015. These disclosures are be incorporated by reference herein, particularly to the extent certain aspects inform the background and state of the art.

An alkaline zinc-ferricyanide (Zn—FeCN) battery is described in U.S. Pat. No. 4,180,623, but high membrane costs and the complexity of handling zinc oxide solid precipitates continue to prevent widespread adoption of this technology. Further iterations have focused on using the ferrocyanide-ferricyanide (FeCN) complex as the positive redox couple which relies entirely on fully complexing (i.e., the reactants must form complexed metal ions), although these iterations suffer from the fact that the FeCN couple has a potential about 400 mV less-positive than Fe(II/III), as well as issues relating to low solubility and the production of toxic gas if the complex is mixed with acid.

Zinc-based hybrid flow batteries rely on zinc's desirably low potential ($E^0 = -0.76\ V_{SHE}$) and high overpotential for hydrogen evolution reactions. Thus, zinc-bromine batteries have been developed, but the use of bromine also requires complexing agents. Additionally, the inherent toxicity of bromine itself presents challenges. Cerium, vanadium, and nickel have also been considered, but these metals tend to add expense and create still further technical challenges.

A zinc-iron flow battery requiring deep eutectic solvents (DES) with an open-circuit potential of 1.02 V was reported in more recent academic literature, but it required excessive temperatures well above ambient conditions in order to provide useful power densities. Additional iron-based flow batteries using triple electrolyte systems and/or selective ion exchange membranes have also been investigated, although the former requires considerable complexity and the latter involves an acidic electrolyte (e.g., zinc sulfate), buffering agents, and other potentially complicated and/or expensive components—particularly in comparison to widely available microporous polymeric membranes. Further, this acidic sulfate system experienced capacity fade, thereby implying difficulty in operating a battery with mixed zinc-iron electrolytes because the ferrous or ferric ions present in the negative electrolyte would be reduced in place of the zinc ions, as noted by Xie in "High performance of zinc-ferrum redox flow battery with Ac/HAc buffer solution," *Journal of Energy Chemistry*, Vol. 25, Issue 3, pp. 495-499, May 2016.

In view of these shortcomings, a system and method with reduced cost and improved performance would be welcomed.

SUMMARY

The present system leverages the advantages of flow batteries and realizes improvements over the aforementioned systems by using a mixed zinc-iron chloride electrolyte. Complexing agents may be added in certain aspects to prevent hydroxide precipitation, and it is believed that the anomalous co-deposition (ACD) of zinc from the mixed electrolyte assists in delivering significant performance and cost advantages in comparison to all-iron and other flow batteries.

In one aspect, the invention may include any combination of the following elements:
  an equimolar electrolyte having iron ions, zinc ions, and chloride ions, said electrolyte separately provided to a positive half-cell and a negative half-cell and said positive and negative half cells positioned proximate on opposing facings of a microporous membrane;
  a positive electrolyte reservoir containing a positive electrolyte having zinc and iron ions at a first predetermined molar concentration;
  a negative electrolyte reservoir containing a negative electrolyte having zinc and iron ions at a second predetermined molar concentration;
  a reaction cell including a microporous separator dividing the cell into a positive half and a negative half, with the positive half in fluid communication with the positive electrolyte reservoir and the negative half in fluid communication with the negative half;
  wherein the first and second predetermined molar concentrations are approximately equal;
  wherein the first and second predetermined molar concentrations are approximately not equal and/or differ by more than 5%, 10%, 20%, or 25% or more;
  wherein at least one of the positive electrolyte and the negative electrolyte further comprises a complexing ligand;
  wherein the pH of both the positive and the negative electrolyte is less than 2.0;
  at least one titanium, graphite or glassy carbon substrate provided within the reaction cell;
  wherein microporous separator consists essentially of a polymeric material; and
  wherein the microporous separator is at least partially coated by polyvinyl alcohol.

In another aspect, a method is contemplated having any combination of the following steps:
  providing a first reservoir containing a positive electrolyte having zinc and iron ions and a second reservoir containing negative electrolyte having zinc and iron ions, wherein the first and second reservoirs are fluidically connected to a reaction cell having a microporous separator;
  sustaining anomalous co-deposition to promote preferentially electrodepositing of zinc ions in the negative electrolyte;
  selectively charging or discharging the hybrid flow battery as needed;
  wherein sustaining anomalous co-deposition includes suppressing formation of insoluble iron hydroxide compounds;
  wherein sustaining anomalous co-deposition includes maintaining a pH of 3.0 or less within the electrolyte;
  wherein the pH is less than 2.0;
  wherein sustaining anomalous co-deposition includes deviating charging waveforms from direct current waveforms;
  wherein the deviating waveforms includes at least one of: providing alternating current, providing asymmetric on/off sequences, and providing variable on/off sequences;
  wherein a polymeric membrane is provided as the microporous separator; and
  wherein polyvinyl alcohol is coated on or in the polymeric membrane.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein.

In the drawings:

FIG. 2A is a voltammogram of a zinc-iron alloy deposition and dissolution according to certain disclosed aspects, while

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise. Terms of art should be afforded their customary meaning within the context that they are used.

Figure 1:
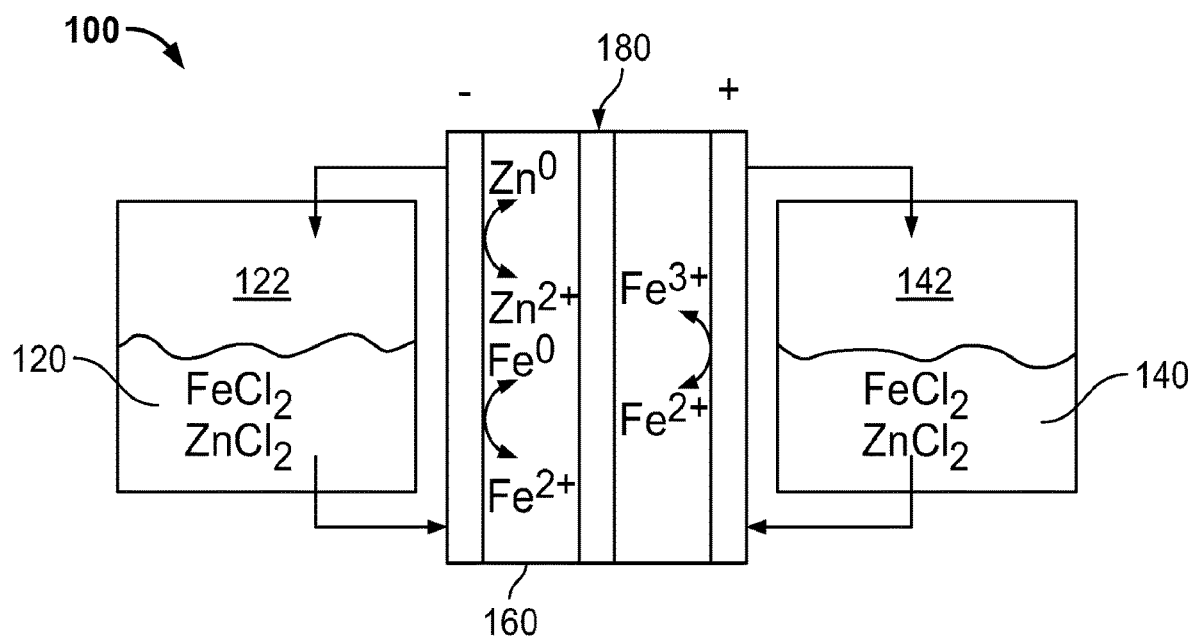
FIG. 1 is a schematic representation of a zinc-iron hybrid flow battery with a microporous separator according to certain disclosed aspects.

FIG. 1 illustrates one embodiment of the zinc-iron hybrid flow battery contemplated herein. Battery 100 includes a negative electrolyte 120 contained within an negative electrolyte reservoir 122 and a positive electrolyte 140 contained within a positive electrolyte reservoir 142. Electrolytes 120, 140 may be substantially equimolar mixtures of iron chloride and zinc chloride, and both are circulated through a reaction cell 160 including a separator, such as a porous or microporous (i.e., pore sizes ranging between 0.01 to 10 micrometers, preferably with interconnected and/or tortuous pores) polymeric separator 180 to allow for the oxidation and reduction reactions which ultimately provide charge and discharge capabilities to the battery 100. Additional conduits, pumps, and the like (not shown) may facilitate the necessary flow of reactants throughout the battery 100.

The positive electrolyte 140 is essentially identical to known all-iron flow batteries, in that ferrous ions ($Fe^{2+}$) are oxidized to ferric ions ($Fe^{3+}$) during charging (with the reverse process occurring during discharge), as indicated on the surface of the positive electrode side of reaction cell 160. However, the negative electrolyte 120 includes both ferrous ions and zinc ions ($Zn^{2+}$) that may be reduced and oxidized at the same time on the negative electrode side of the cell 160. This possibility of co-deposition of zinc and ferrous ions within the negative electrolyte provides unique performance advantages in comparison to all-iron batteries, while retaining many of their other advantages (in comparison to other known flow battery chemistries/systems) such as low cost and relatively safe/harmless reactants.

Previously, it was believed that zinc and iron could not be used together in a standard flow battery arrangement, and especially in circumstances where electrolyte mixing would be possible, as may occur with the use of a microporous separator. In particular, excess hydrogen evolution was expected because of iron would plate out instead of zinc and/or because an alloy of the metals would form, with iron decreasing the coulombic efficiency since it is more active.

The inventors have now discovered that iron electrodeposition is inhibited in the presence of $Zn^{2+}$ in the negative electrode via a process referred to as anomalous co-deposition. Unlike plating applications wherein anomalous co-deposition is relatively known, its use in a battery is premised on completely inhibiting iron deposition in order to maintain the zinc potential and hinder hydrogen evolution. Thus, zinc preferentially electrodeposits and is stripped out of equimolar solutions of $ZnCl_2$ and $FeCl_2$ without having a significant effect on the Fe(II/III) couple at the positive electrode. This preferential deposition of zinc at the negative electrode occurs with similar behavior on titanium, graphite and glassy carbon substrates (forming part of or contained within the reaction cell 160) and has been found to be governed mainly by mass-transport mechanisms.

Further, the use of a microporous separator avoids the expense and complexity of ion-exchange membranes. Microporous separators made from common polymeric materials (polyethylene, polypropylene, etc.) are already in widespread use for numerous other battery applications. In contrast, ion-exchange membranes require additional charged ion groups to be incorporated into the polymer matrix, requiring additional materials and more complicated manufacturing. Thus, in one embodiment, the microporous separator consists essentially of only polymeric materials (e.g., polypropylene, polyethylene, etc.) and, therefore, is devoid of any ion-exchanging materials, matrices, or substances.

Microporous separators appropriate for use in certain aspects can be obtained from Daramic LLC and/or Celgard., LLC, both of which have offices in Charlotte, N.C., U.S.A. In certain aspects the separators may be 150, 175, 200, 225, or 250 micrometers in thickness. Other aspects may involve the use of polyvinyl alcohol coated on or in the membrane. Still other low cost and widely available separator materials could be used.

The reliance on chloride-based electrolytes, and particularly equimolar mixtures, promotes anomalous co-deposition. In contrast, sulfates tend to have the opposite effect, thereby causing many previous efforts to overlook the prospective benefits realized by the present disclosure. That is, sulfates do not exhibit anomalous co-deposition at a comparable level, so that previous efforts in that system simply did not—and could not—realize the advantages now realized by the inventors. The inventors have further established that chloride-based electrolytes also increase current efficiency and conductivity in comparison to sulfates.

In practice, the zinc-iron hybrid battery relies on the following reactions for the negative electrode:

$$Zn^{2+}+2e \rightleftharpoons Zn \quad E^0=-0.76V \tag{1}$$

$$Fe^{3+}+e \rightleftharpoons Fe^{2+} \quad E^0=+0.77V \tag{2}$$

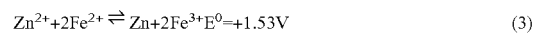

$$Zn^{2+}+2Fe^{2+} \rightleftharpoons Zn+2Fe^{3+} \quad E^0=+1.53V \tag{3}$$

However, galvanic displacement during discharge via Equation 4 below can present challenges. If the galvanic displacement of zinc by iron is slow, then the charge-discharge processes can be carried out with efficiency similar to that which could be obtained from a "pure" electrolyte containing only $Zn^{2+}$ in the negative electrolyte. By maintaining a low pH (i.e., less than 3.0, 2.0, or 1.0), the formation of insoluble iron hydroxide precipitates (normally encountered when the pH is between 2.0 and 3.0) could be avoided to minimize hydrogen evolution.

$$Zn+Fe^{2+} \rightarrow Fe+Zn^{2+} \quad E^0=-0.32V \tag{4}$$

The anomalous behavior of electroplating from such mixed electrolytes can be attributed to the so-called hydroxide suppression mechanism (HSM), wherein the formation of a surface hydroxide layer (e.g., $Zn(OH)_2$) impedes the transport of the more noble metal ions to the underlying substrate. Although a consensus on HSM has not yet been reached, anomalous co-deposition can nevertheless be leveraged for application in a flow battery as described herein.

Exemplary concentrations for both electrolytes contemplate a total metal ion concentration between 1.0 to 3.0 moles/Liter. This disclosure expressly contemplates further subsets of ranges encompassed by that broadest range, including but not limited to any combination bounded by two values selected from the following list: 1.0; 1.1; 1.2; 1.3; 1.4; 1.5; 1.6; 1.7; 1.8; 1.9; 2.0; 2.1; 2.2; 2.3; 2.4; 2.5; 2.6; 2.7; 2.8; 2.9; and 3.0. In the same manner, the molar ratio of Zn/Fe according to certain aspects may be between 1.0 and 4.0, with every one tenth intervals between these boundaries expressly disclosed and contemplated herein.

With respect to electrolyte flow, experiments have shown that it may be possible to extrapolate optimum flow rates for a given system in order to best exploit anomalous co-deposition. Further, flow rates become more important as charging current densities increase. It is also believed that faster flow rates for the electrolytes may allow for lower Zn/Fe molar ratios in certain aspects. Differing flow rates and/or temperatures for charging and discharging modes of operation may further optimize the anomalous co-deposition effect (and, by extension, battery performance).

Also, charging waveforms may deviate from direct current (DC) to further improve plating quality and/or efficiency. For example, simple alternating currents of 0.5 ms on and 0.5 ms off may be effective. Further variations, including assymetric on/off timing and sequences, as well as variations in the length of each of the on and off cycle, are also contemplated.

In order to suppress dendrite growth during charge-discharge cycling, organic additives may be added to one or both electrolytes. Bismuth-based salts (e.g., bismuth trichloride), polyetheneimine, and polyethylene glycol may have utility in this regard.

Hydrogen recombination schemes may also be employed. These schemes manage evolution of hydrogen within the system, particularly in the positive electrolyte reservoir.

While the foregoing description of FIG. 1 characterizes certain embodiments as a "battery," it will be understood that this disclosure encompasses cells and systems incorporating the structures and methods described herein. That is, while a battery includes necessary components (electrodes/electrolytes, terminals, separator, ancillary items such as safety vents, controls, systems, etc.), the invention includes cells that may form a battery, as well as systems that incorporate and/or rely on such cells and batteries. Such systems may include electrolyte flow controls (e.g., pumps, valves, tubular or other fluidc connectors, etc.), safety mechanisms (e.g., vents formed within the flow path to avoid excessive pressures, shutdown mechanism, etc.), and electrical connections (e.g., one or more battery terminals, circuitry to monitor, regulate, or alter electrical outputs and inputs, etc.).

Figure 2A:
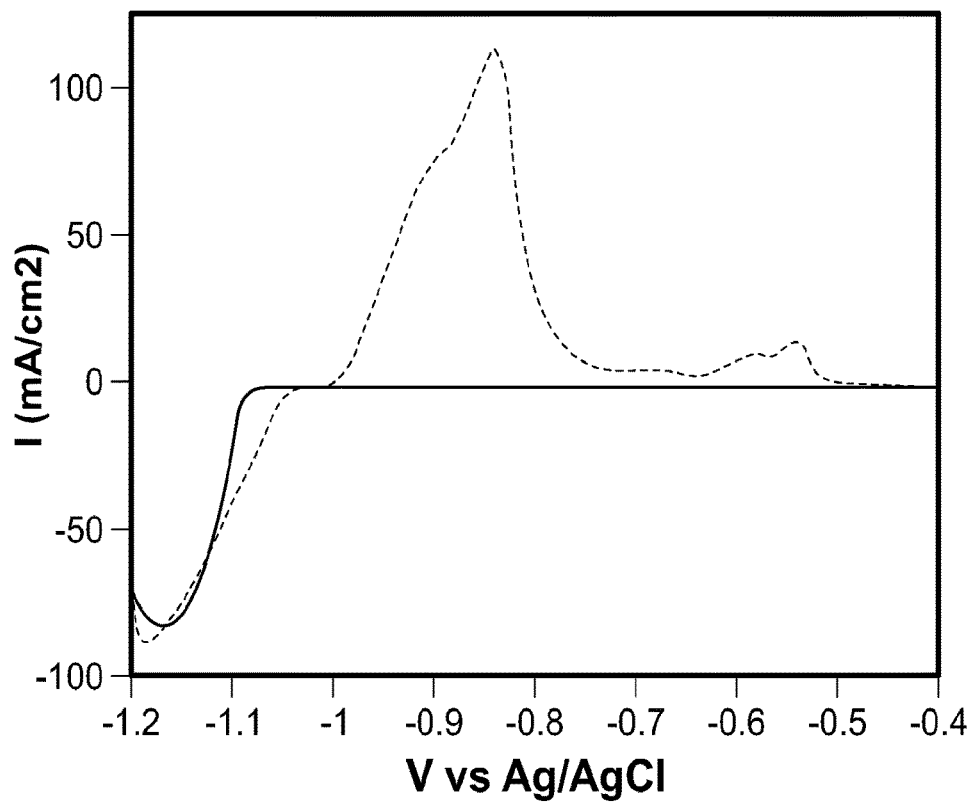
Figure 3:
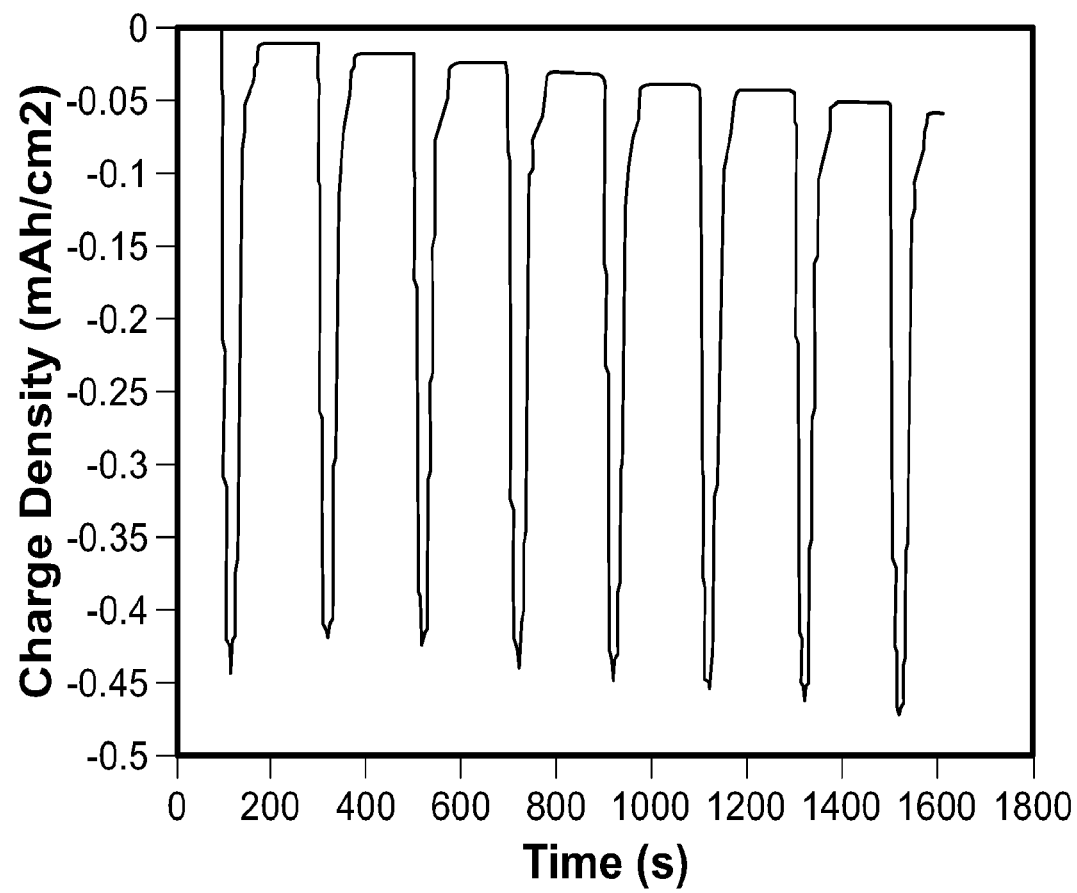
FIG. 3 shows the coulombic efficiency of deposition and dissolution of the zinc-iron alloy electrolytes according to certain disclosed aspects.

FIG. 2A is a voltammogram showing the deposition and dissolution from exemplary electrolytes 120, 140. The anodic peaks that deposit contain both zinc and iron, with efficient deposition and good coulombic efficiency over at least eight cycles, as seen in FIG. 3. In particular, the vast majority of the charge from the deposit is reoved during the discharge, thereby indicating an efficient charge-discharge process.

Figure 2B:
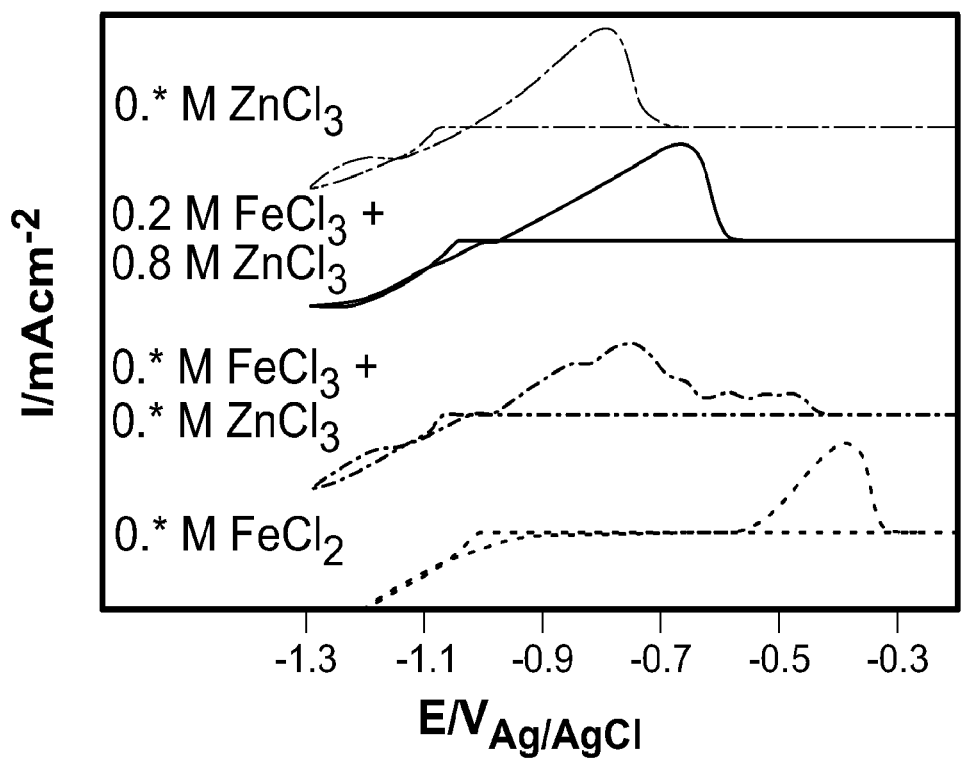
FIG. 2B shows comparative results relative to all-iron, all-zinc, and zinc-iron hybrids.

Comparative voltammograms of all-iron, all-zinc, and zinc-iron hybrids are shown in FIG. 2B. It is noteworthy that in the iron-only solution, there is about 360 mV of overpotential before plating, compared to about 60 mV for zinc. Due to the high overpotential for iron plating, the reduction curves for iron and zinc occur within only about 50 mV of one another despite a 300 mV difference in their standard reduction potentials.

Figure 2C:
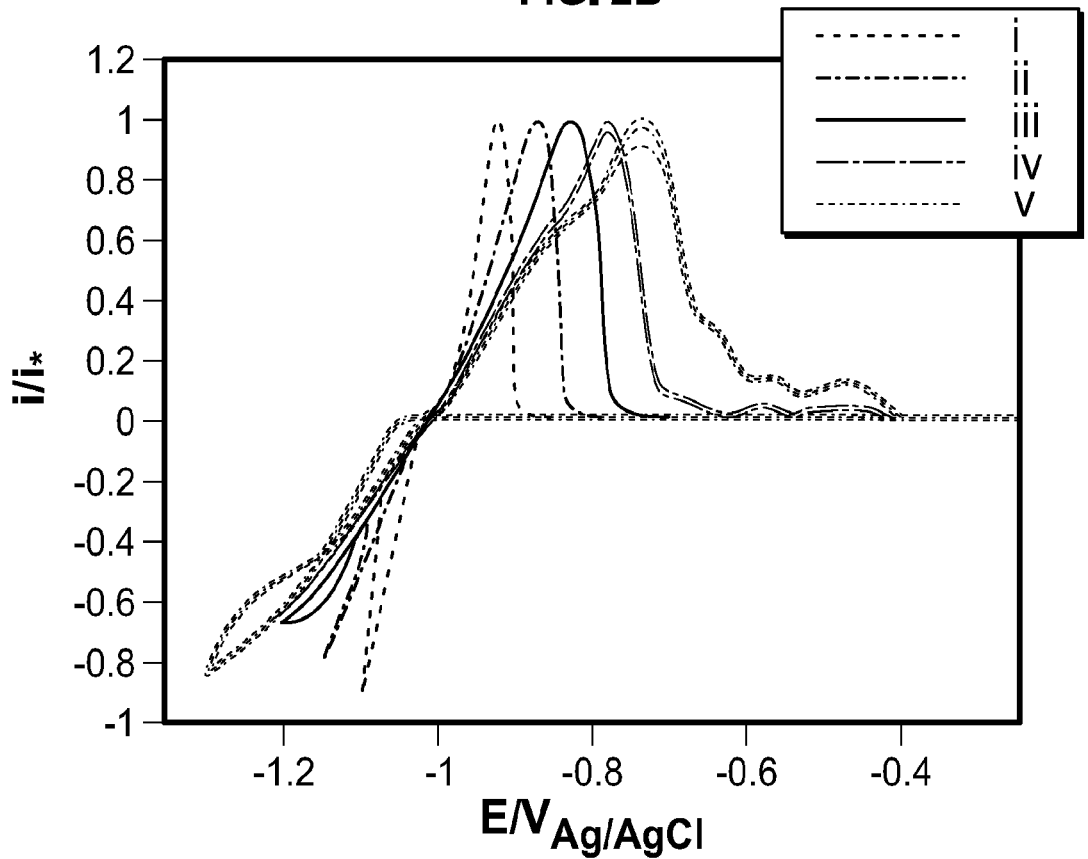
FIG. 2C shows the effect of a negative scan limit ($v=10$ mVs$^{-1}$) on deposition and stripping from equimolar $ZnCl_2$—$FeCl_2$ solutions where current is normalized to the peak stripping current.

When scanning to −1300 mV versus Ag/AgCl, the shape of the stripping peak depended on the Zn/Fe ratio in the bulk solution. Increasing the ratio caused the voltammogram to become similar to that of pure zinc. At smaller overpotentials (more positive scan limits), though, iron stripping peaks were not observed, even when zinc plating and stripping took place, as seen in FIG. 2C. FIG. 2C shows the effect of a negative scan limit ($v=10$ $mVs^{-1}$) on deposition and stripping from equimolar $ZnCl_2$—$FeCl_2$ solutions where current is normalized to the peak stripping current and curve (i) is at −1100 mV, curve (ii) at −1150 mV, curve (iii) at −1200 mV, curve (iv) at −1250 mV, and curve (v) at −1300 mV (note that all solutions for these curves also contained $NH_4Cl$ supporting electrolyte adjusted to maintain approximately 3 M of chloride ion ($Cl^-$)). Iron stripping peaks were nearly absent when scanning to −1100 mV, −1150 mV and −1200 mV.

Figure 2D:
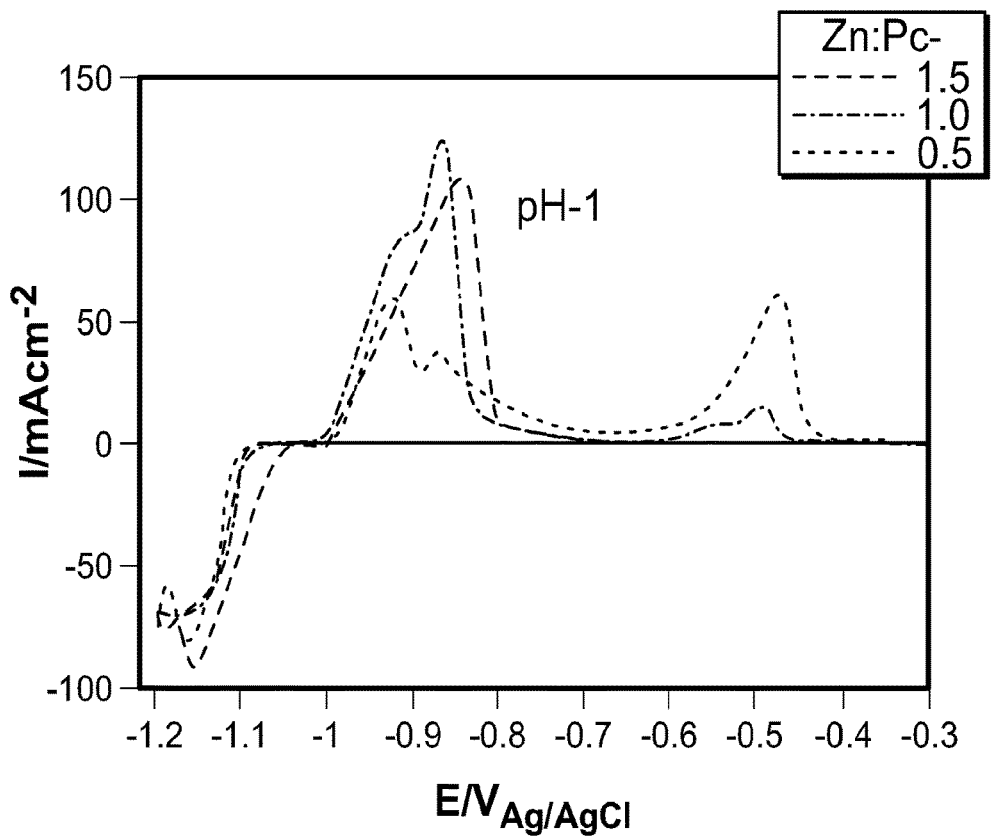
FIG. 2D shows the inhibition of iron plating in a range of equimolar solutions as indicated by each plot line.
Figure 2D:
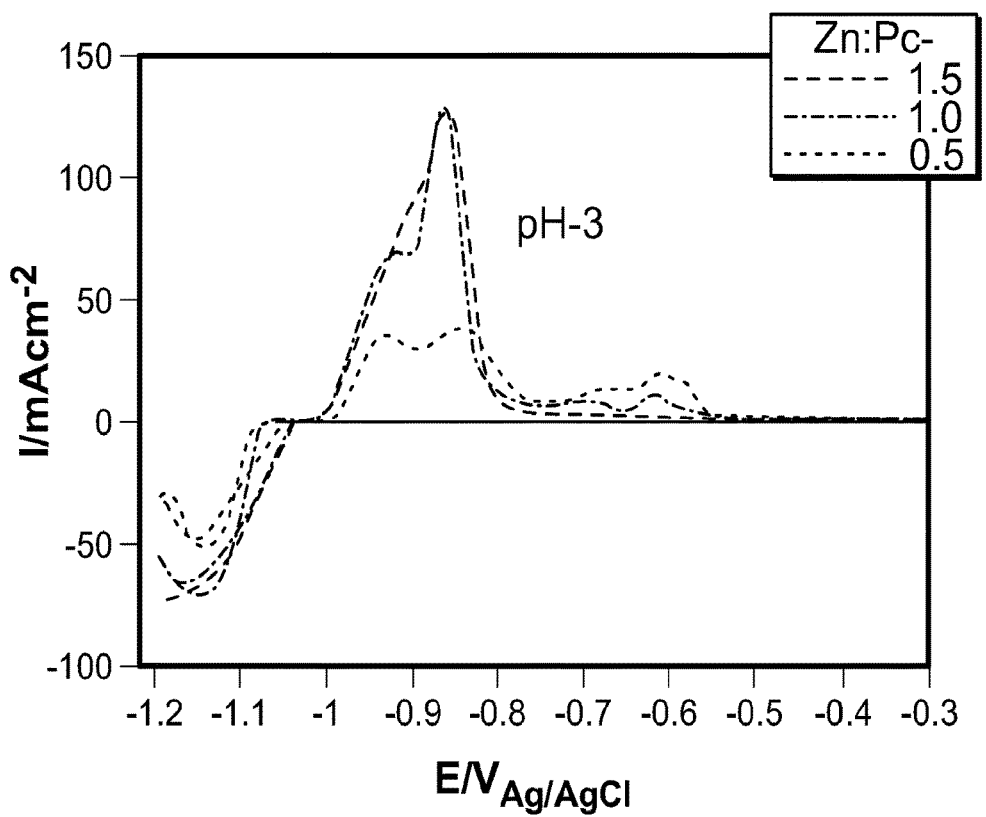

The inhibition of iron plating in the equimolar solution is shown in closer detail in FIG. 2D. Curve (i) contained only 0.5 M FeCl2, whereas curve (ii) contained 0.5 M FeCl2+0.5 M ZnCl2. Reduction currents for the iron-only solution, (i), started at approximately −1.0 V versus Ag/AgCl, followed by a stripping peak in the region of −0.6 to −0.2 V. When solution (ii) was used, however, there was no significant iron stripping peak despite a clear zinc stripping peak in the region of −1.0 to −0.8 V versus Ag/AgCl. Since the onset of the reduction current from solution (ii) was about 60 mV more negative than that from solution (i), conventional alloy plating theory would expect that iron reduction should have also taken place concurrently, but this was not the observed. These results can best be explained by the inhibition of iron reduction by zinc ions. Increased Zn/Fe corresponded to increased current activity in the range of zinc stripping—1.0<E<−0.75, as well as decreased peaks in the range of iron stripping (−0.66 E>−0.4). The voltammograms were compared at pH 1 and pH 3 to explore where pH might affect the plating and stripping processes, as might be predicted from the hydroxide suppression mechanism. However, no significant differences were observed. While not wishing to be bound by any theory, the inventors posit that that anomalous co-deposition does not correlate positively with pH levels, thereby allowing for further leveraging of anomalous co-deposition in disclosed hybrid flow battery.

Figure 4A:
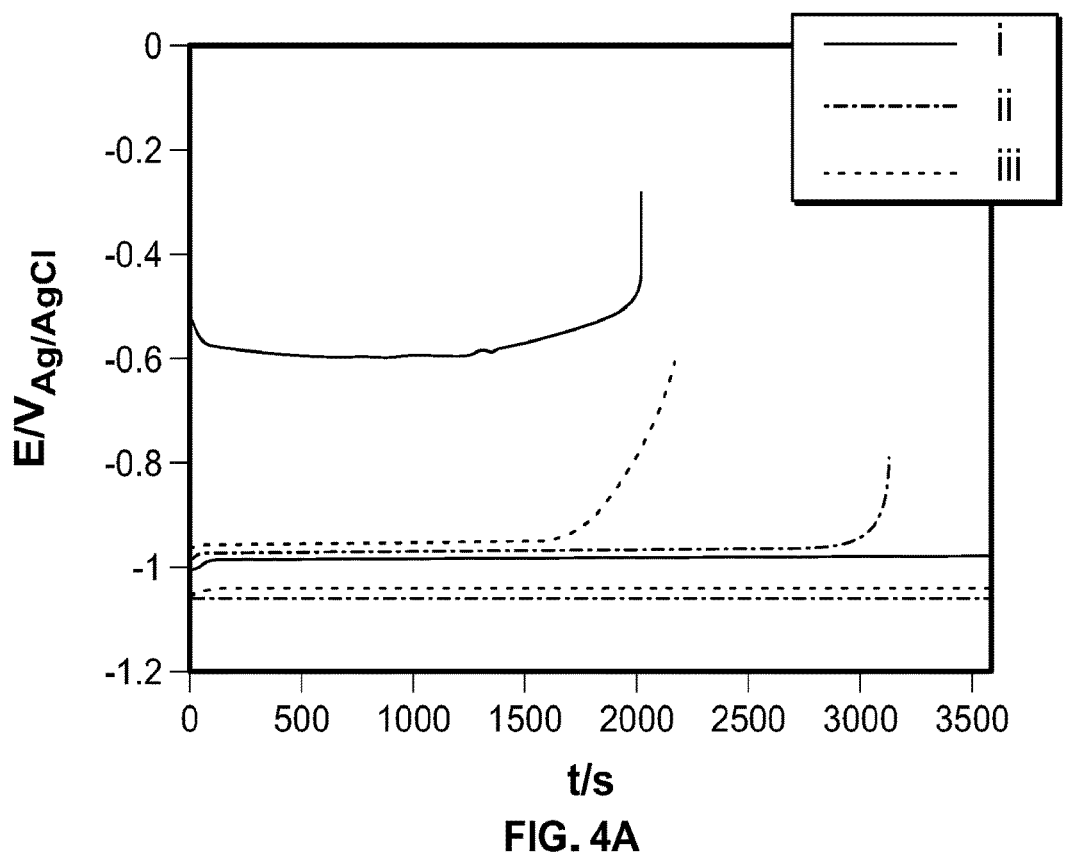
FIGS. 4A and 4B depicts a comparison of steady-state plating and stripping processes was made between pure iron, pure zinc, and equimolar solutions at pH=1.
Figure 4B:
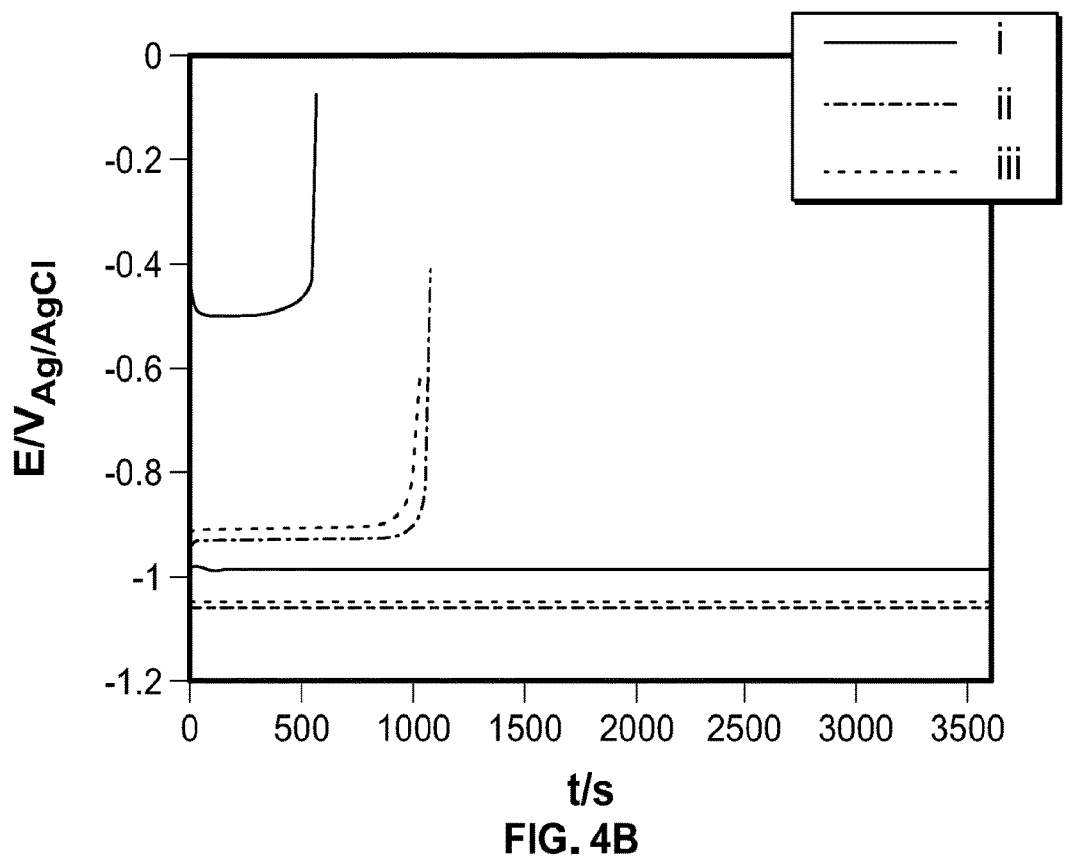

A comparison of steady-state plating and stripping processes was made between pure iron, pure zinc, and equimolar solutions at pH=1, as shown in FIGS. 4A and 4B. The plating was carried out at −20 $mA/cm^2$ in all cases, but the stripping was carried out at both 20 and 60 $mA/cm^2$ to assess the effect on coulombic efficiency. Curve (i) shows 0.5 M $FeCl_2$, curve (i) shows 0.5 M $ZnCl_2$, and curve (iii) shows 0.5 M $FeCl_2$+0.5 M $ZnCl_2$.

In FIG. 4B, the lower, flat curves represent plating processes for each composition while, immediately after plating, the deposit was stripped in the upper curves. Iron plating occurred at approximately −1.0 V versus Ag/AgCl, whereas both the zinc and equimolar zinc-iron solutions deposited at approximately −1060 mV. The deposit from the equimolar solution stripped at nearly the same potential as that from the pure zinc solution, but with a lower current efficiency, as shown in FIG. 4A. At 60 mA/cm², however, the stripping curve from the equimolar solution was almost the same as that from the pure zinc solution, suggesting that zinc-iron chloride batteries operating a low pH may be best-suited for applications requiring relatively high current densities. As with the all-iron flow battery, operating at higher pH can help mitigate the problem of the hydrogen side reactions, but this approach requires identification of appropriate complexing ligands to prevent iron precipitation.

Figure 5A:
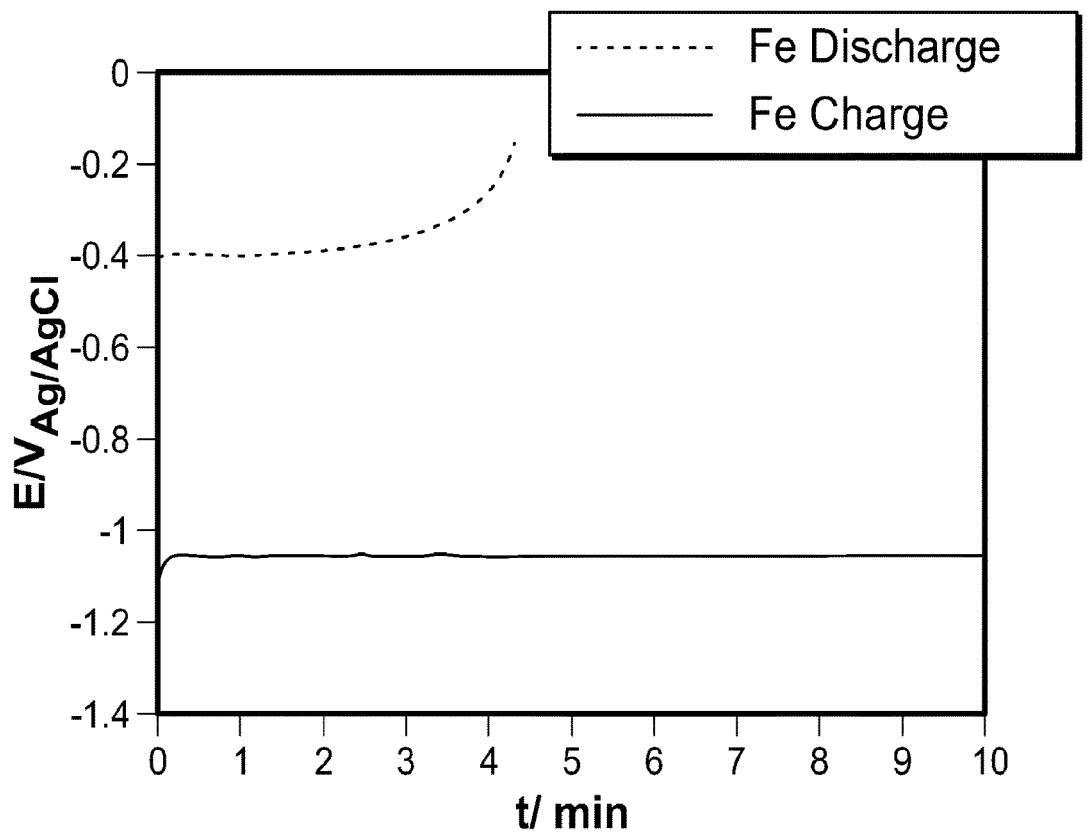
FIGS. 5A and 5B shown charge-discharge tests comparing iron (FIG. 5A, with discharge as the upper plot and charge as the lower plot) with zinc-iron alloy (FIG. 5B, with discharge as the upper plot and charge as the lower plot) at current densities of +/−75 mA/cm$^2$ at a pH of 0.85 under room temperature.
Figure 5B:
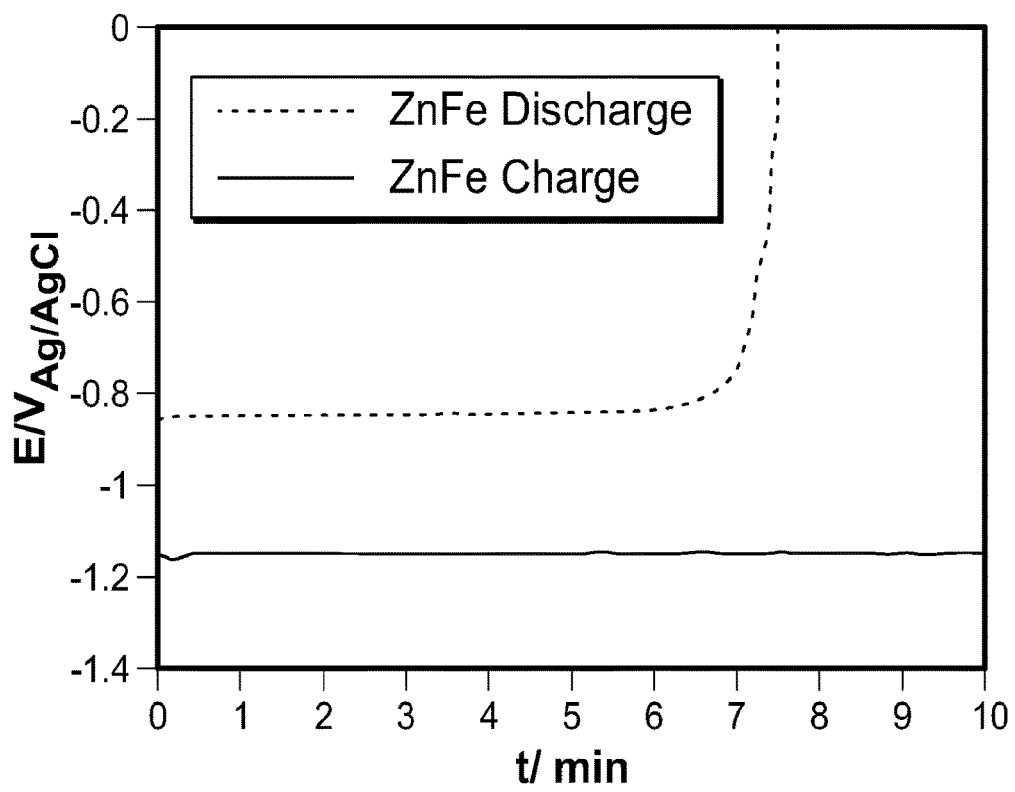

FIGS. 5A and 5B comparatively illustrate the advantages of a zinc-iron mixture (FIG. 5B) in comparison to all-iron (FIG. 5A). These comparative tests were carried out under substantially identical structures and conditions, with current densities varying between +/−75 mA/cm² at a pH of 0.85. As with all data (comparative and otherwise), the testing was conducted at ambient, room temperatures (usually between 18-28 C with little to no variations during the actual testing).

Figure 6A:
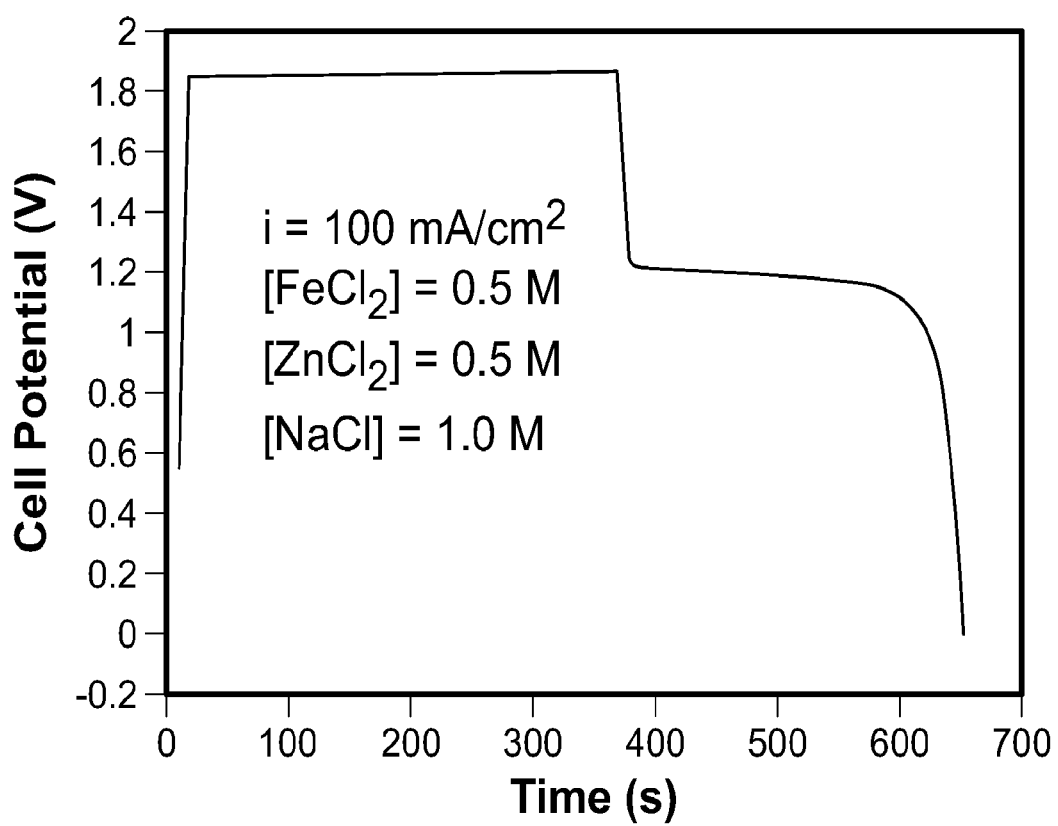
FIGS. 6A and 6B illustrate, respectively speaking, the performance characteristics and the charge-discharge cycling of a zinc-iron hybrid battery at i=100 mA/cm$^2$ with a reaction cell surface area of 30 cm$^2$ under ambient conditions and concentrations for FIG. 6A as follows: [$FeCl_2$]=0.5 M; [$ZnCl_2$]=0.5 M; and [NaCl]=1.0 M.
Figure 6B:
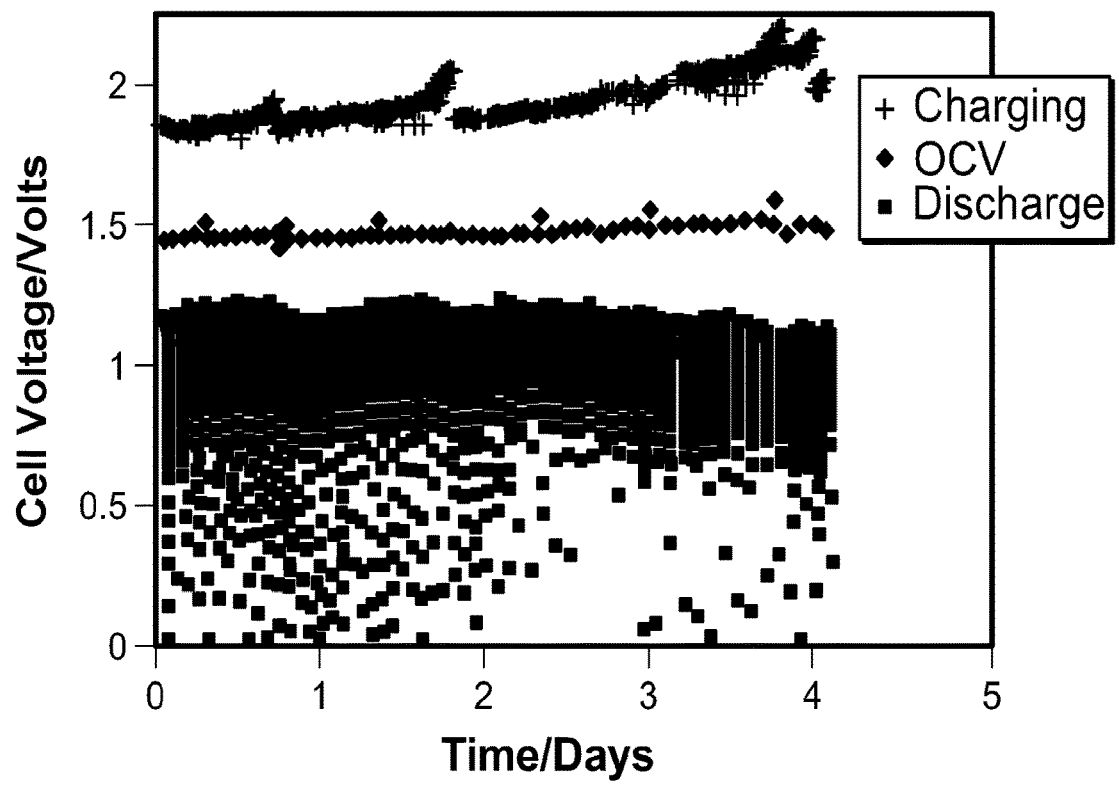
Figure 6B:
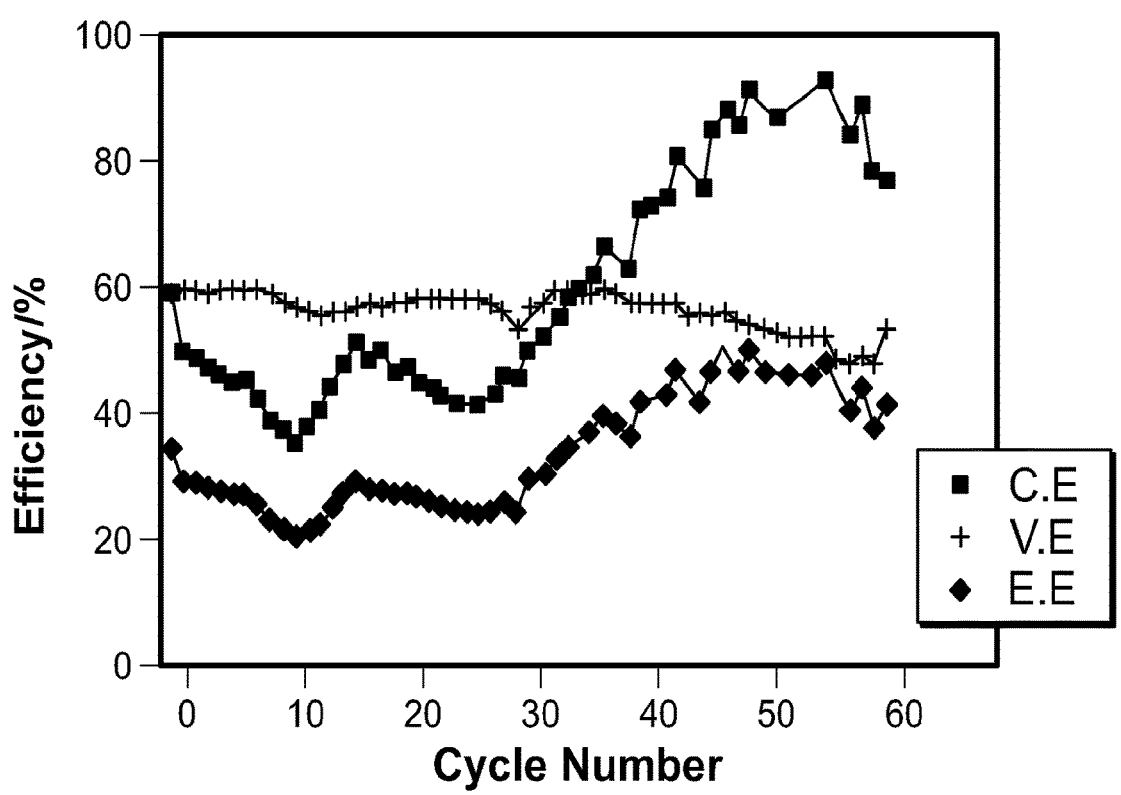

FIG. 6A illustrates performance characteristics for an equimolar zinc-iron alloy hybrid battery having a reaction cell surface area of 30 cm². The resulting cell had an open circuit voltage of about 1.5 volts, with nominal discharge voltage at 1.2 volts for 100 mA/cm² at room temperature. FIG. 6B shows charge-discharge cycling in the battery with a microporous separator at +/−20 mA/cm² at room temperature.

Figure 7:
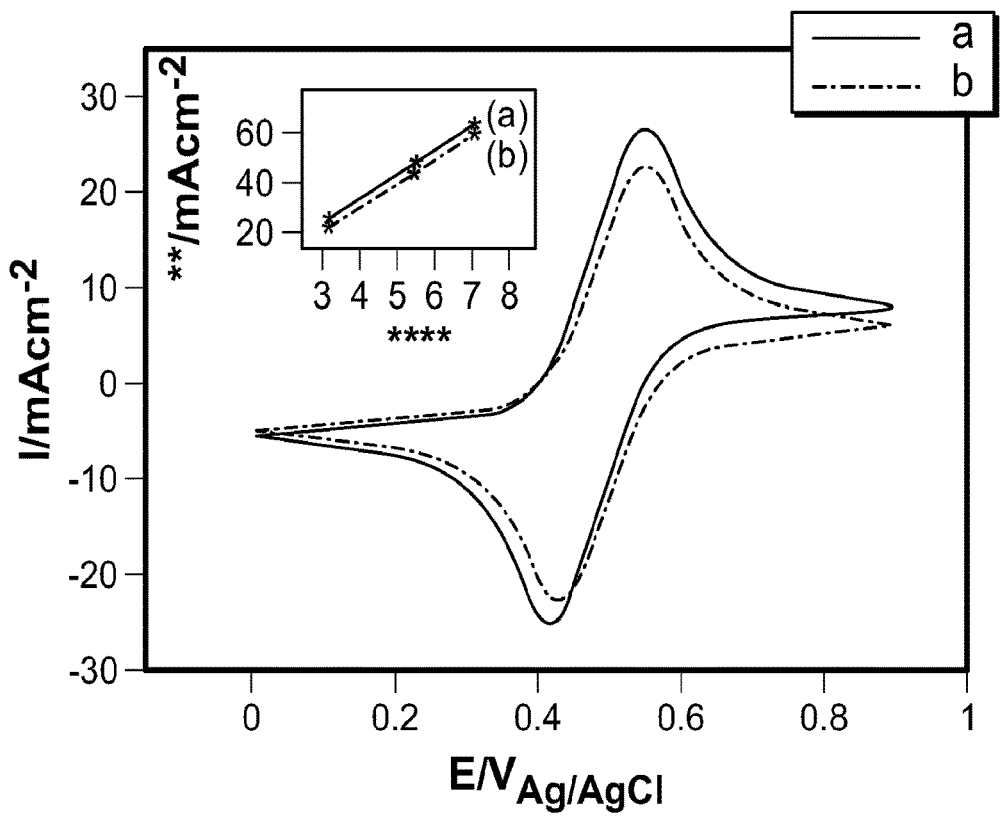
FIG. 7 shows the impact of zinc chloride on the iron II/III redox reaction.

FIG. 7 demonstrates that the positive electrode behavior (i.e., the iron II/III reaction) is not strongly affected by high concentrations of zinc. In all of the data depicted in FIG. 7, the redox reaction was performed on a graphite electrode with 1 M $NH_4Cl$ supporting electrolyte at a pH of 1.0 and v=10 mV/s. Understanding that curve (a) represents 0.2 M $Fe^{2+}$, 0.2 M $Fe^{3+}$, and the modified, equimolar electrolyte) and curve (b) 0.2 M $Fe^{2+}$, 0.2 M $Fe^{3+}$, and 0.8 M $Zn^{2+}$, only a minor depression in electrode activity was observed in solutions containing excess zinc. The scans shown in the inset of FIG. 7 were performed at 10, 30, and 50 mV/s with only a small decrease in the current activity.

Example

Using an H-Cell with a Luggin capillary, deposition and dissolution were examined using solutions containing iron chloride, zinc chloride, and their mixtures. The solution pH was typically adjusted by drop-wise addition of 10 wt. % HCl. Titanium bar (0.020 inches, grade 2A, ASTM B265, $A_{geo}$=1 cm²) and glassy carbon (A=0.197 cm²) were used as substrates.

Initial pre-treatment of the titanium consisted of washing in detergent with hot water followed by rinsing in acetone and isopropyl alcohol. Subsequently, the electrode was sanded by hand (120-grit, Norton T461) to remove surface oxides. Unless otherwise noted, 1.0 M $NH_4Cl$ was used as a supporting electrolyte.

Cyclic voltammetry was carried out by scanning the potential from −0.2 to −1.3 V versus Ag/AgCl at scan rates, v, ranging from 2-50 mV/s using a Solartron Modulab potentiostat. Effects 60 of transport were studied using a rotator (Pine, Inc.) with a glassy carbon electrode (A=0:197 cm²).

A flow battery ($A_{geo}$=6:25 cm²) consisting of graphite plates as electrodes and a microporous separator (Daramic 175, thickness=175 micrometers) was used, with the flow provided by peristaltic pumps. The positive electrode contained 2-mm thick 65 carbon felt bonded to graphite. In order to provide space for fluid flow, Teflon gaskets (2-mm thick) were used on each side of the separator. The initial negative electrolyte contained 1.12 M $ZnCl_2$ and 0.8 M $FeCl_2$, and the initial positive electrolyte contained 1.6 M $ZnCl_2$, 0.56 M $FeCl_2$ and 0.24 M $FeCl_3$. Both electrolytes contained 2.0 M $NH_4Cl$ supporting electrolyte and 2 g/L $PEG_{8000}$ to moderate dendrite growth. The volume of each electrolyte was 175 mL.

Charging and discharging were carried out at +/−25 mA/cm². Coulombic and voltaic efficiencies were estimated using $CE=Q_{discharge}/Q_{charge}$ and $VE=\dot{E}_{discharge}/\dot{E}_{charge}$, where Q represents charge in coulombs and Ė represents the average value of potential. Battery charging was carried out for one hour, and discharges were carried out until the cell reached a cutoff voltage of 0.0 V. Temperature was maintained at 25 C using an in-line shell-and-tube heat exchanger.

Figure 8:
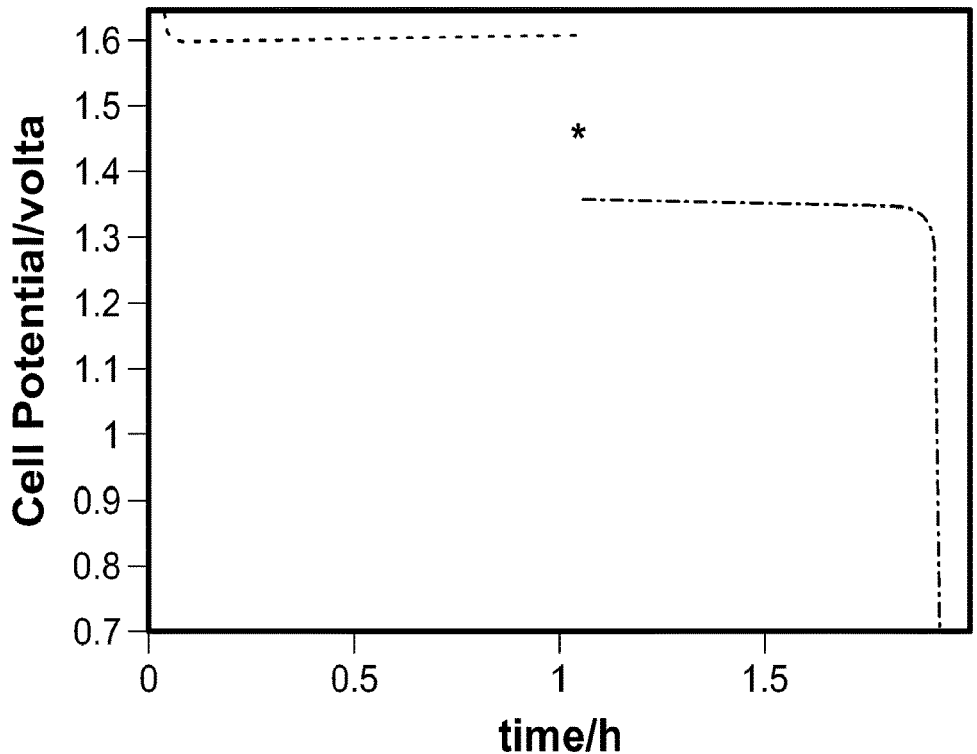
FIGS. 8, 9(a), and 9(b) show—respectively speaking—battery charge-discharge cycles, cell potential as function of time through the first two days of testing (with the upper plot representing charging, the middle plot being open current voltage, and the lower plot being charging), and estimated voltaic efficiency (V.E.), coulombic efficiency (C.E.), and energy efficiency (E.E.) during 10 days of continuous charge-discharge cycling at room temperature for the battery described in the Example.

This proof-of-concept battery operating at (T=25 C) was tested during 10 days and 127 cycles of continuous charge-discharge cycling at +/−25 mA/cm², where each charge was carried out for one hour (charge loading=25 mA/cm²). The open-circuit potential of about 1.5 V suggested that: (1) the deposit contained primarily zinc; (2) the potential of the positive electrode was not affected by the presence of zinc; and (3) the displacement of zinc by iron was not sufficiently fast so as to bring the electrode to potential of iron; an OCV of about 1.2 V would have been observed if the negative electrode surface had consisted of primarily iron. Voltage profiles during a typical charge-discharge cycle were 165 relatively at, as shown in FIG. 8.

Figure 9A:
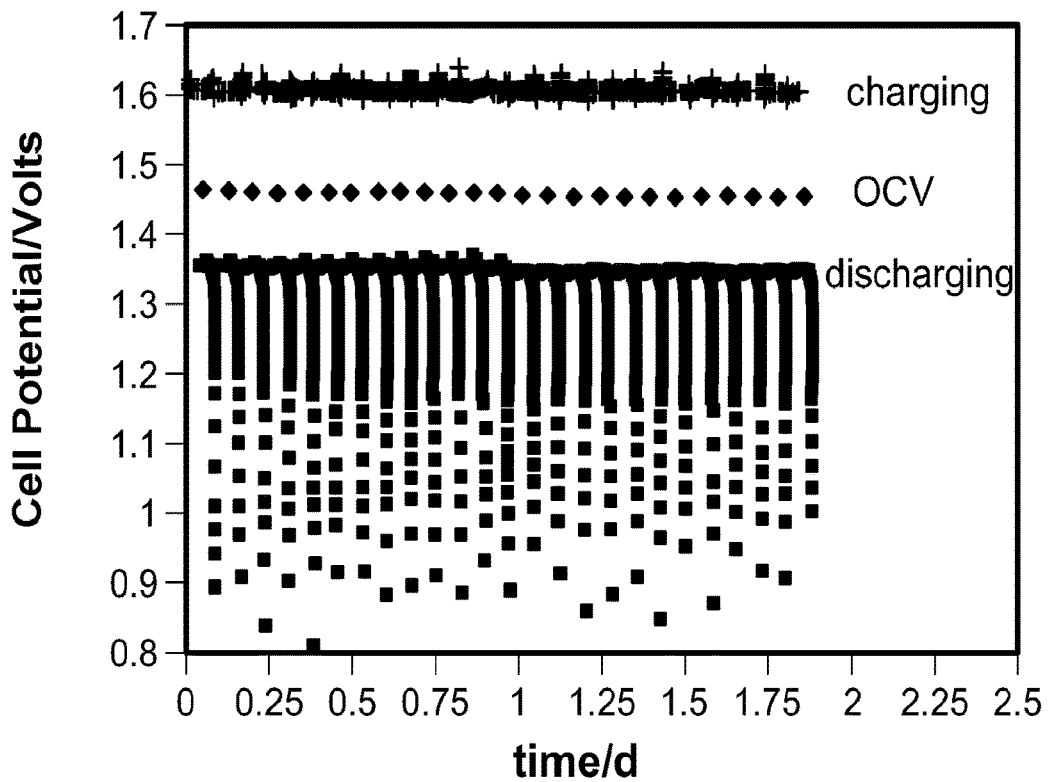
Figure 9B:
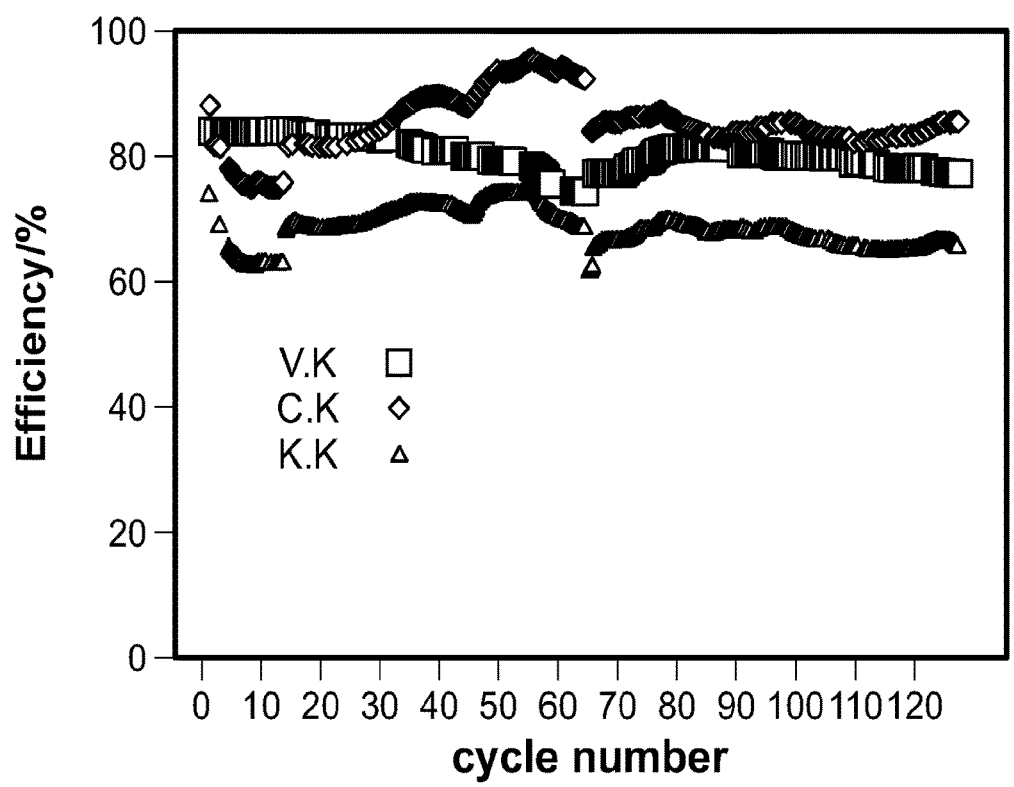

The average coulombic, voltaic and energy efficiencies were 85%, 80% and 68%, respectively. The cell potential of the battery during the first two days is shown in FIG. 9(a), and the variation of efficiencies during 127 cycles is shown in FIG. 9(b).

The performance was relatively stable, without any evidence of rapid degradation. Initially, there was a pressure imbalance due to the fact that the positive electrolyte owed through a porous felt whereas the negative electrolyte did not, so there was a gradual transfer of fluid from positive to negative. This was corrected by increasing the negative back-pressure with a needle valve; this increased the stability and increased coulombic efficiency, presumably by decreasing the Fe(III) crossover rate.

It was also noted that during cycles 20-50, voltaic efficiency was decreasing while coulombic efficiency was increasing (reaching a maximum of 94.7%), possibly due to the formation of some hydroxide precipitates, which formed a coating on the separator and hindered Fe(III) crossover. During the 65$^{th}$ cycle, 2.5 g of citric acid (equivalent to about 35 mM) was added to the electrolytes in order to complex the iron hydroxides this was associated with an increase in voltaic efficiency and a corresponding decrease in coulombic efficiency; presumably clearing up the separator pores.

Based on these results, appropriate complexing ligands, as well as optimizing their concentrations, may further improve zinc-iron chloride flow batteries. For example, any known ligand or combination of ligands that complex with iron may be useful, including any of citrate, acetate, Ethylenediaminetetraacetic acid (EDTA), Diethylenetriamine pentaacetate (DTPA), glycol, glycine, succinate, maonate, salicylate, and oxalate. The overall concentration of ligands should be between 0.02 to 0.2 moles/Liter, with any one hundredth interval between these boundaries (e.g, 0.03; 0.04; 0.05; etc.) also contemplated and disclosed herein.

In terms improving performance, it may be possible to reduce the relative effect of Fe(III) crossover by diffusion by increasing the charging current density and by using thicker or modified separators. Most importantly, despite many days of operation using mixed electrolytes, neither the presence of Fe(II) nor Fe(III) in the negative electrolyte appeared to cause any irreversible performance degradation, it was clear that zinc, rather than iron, was the primary species being deposited and stripped.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A zinc-iron flow battery comprising an equimolar electrolyte having iron ions, zinc ions, and chloride ions, said electrolyte separately provided to a positive half-cell and a negative half-cell and said positive and negative half cells in fluid communication with opposing facings of a microporous membrane.

2. A method of operating a hybrid flow battery comprising:
providing a first reservoir containing a positive electrolyte having zinc and iron ions and a second reservoir containing negative electrolyte having zinc and iron ions, wherein the first and second reservoirs are fluidically connected to a reaction cell having a microporous separator;
sustaining anomalous co-deposition by deviating charging waveforms from direct current waveforms to promote preferentially electrodepositing of zinc ions in the negative electrolyte; and
selectively charging or discharging the hybrid flow battery as needed.

3. The method of claim 2 wherein sustaining anomalous co-deposition includes suppressing formation of insoluble iron hydroxide compounds.

4. The method of claim 2 wherein sustaining anomalous co-deposition includes maintaining a pH of 3.0 or less within the electrolyte.

5. The method of claim 4 wherein the pH is less than 2.0.

6. The method of claim 2 wherein the deviating waveforms includes at least one of: providing alternating current, providing asymmetric on/off sequences, and providing variable on/off sequences.

7. The method of claim 2 wherein a polymeric membrane is provided as the microporous separator.

8. The method of claim 7 wherein polyvinyl alcohol is coated on or in the polymeric membrane.

9. A method of operating a hybrid flow battery comprising:
providing a first reservoir containing a positive electrolyte having iron and zinc ions and a second reservoir containing negative electrolyte having iron ions and $Zn^{2+}$ ions, wherein the first and second reservoirs are fluidically connected to a reaction cell having a microporous separator;
sustaining anomalous co-deposition to promote preferentially electrodepositing of zinc ions in the negative electrolyte and oxidation or reduction of ferrous and ferric ions in the positive electrolyte; and
selectively charging or discharging the hybrid flow battery as needed.

10. The method of claim 9 wherein the anomalous co-deposition is sustained by suppressing formation of insoluble iron hydroxide compounds.

11. The method of claim 9 wherein a polymeric membrane, with polyvinyl alcohol coated on or in the polymeric membrane, is provided as the microporous separator.

* * * * *